United States Patent [19]
Karl et al.

[11] Patent Number: 5,859,120
[45] Date of Patent: Jan. 12, 1999

[54] CARBON BLACK AND PROCESSES FOR MANUFACTURING

[75] Inventors: Alfons Karl, Gruendau; Burkhard Freund, Erftstadt; Karl Vogel, Alzenau, all of Germany

[73] Assignee: Degussa Aktiengesellschaft, Frankfurt am Main, Germany

[21] Appl. No.: 824,246

[22] Filed: Mar. 25, 1997

[30] Foreign Application Priority Data

Apr. 4, 1996 [DE] Germany ................... 196 13 796.9

[51] Int. Cl.$^6$ .............. C08L 21/00; C08K 9/06; C08K 3/04; C09C 1/44
[52] U.S. Cl. .............. 524/495; 524/571; 524/573; 423/449.2; 423/449.4; 423/449.6; 423/449.7; 423/450; 423/451; 423/454; 423/458; 423/459
[58] Field of Search .............. 423/449.6, 449.7, 423/449.2, 449.4, 450, 451, 454, 459, 458; 524/571, 573, 495

[56] References Cited

U.S. PATENT DOCUMENTS 4,670,059 6/1987 Hackleman et al. ............ 106/307
4,820,751 4/1989 Takeshita et al. ............ 523/215

FOREIGN PATENT DOCUMENTS

96/37547 11/1996 WIPO .

*Primary Examiner*—Frederick Krass
*Attorney, Agent, or Firm*—Beveridge, DeGrandi, Weilacher & Young, L.L.P.

[57] ABSTRACT

Carbon blacks containing silicon and a process for manufacturing them. The carbon blacks containing silicon are suitable as reinforcing carbon blacks for rubber mixtures and give the latter viscoelastic properties such as reduced rolling resistance in tires. At the same time, the wet traction is even improved in the process.

12 Claims, 1 Drawing Sheet

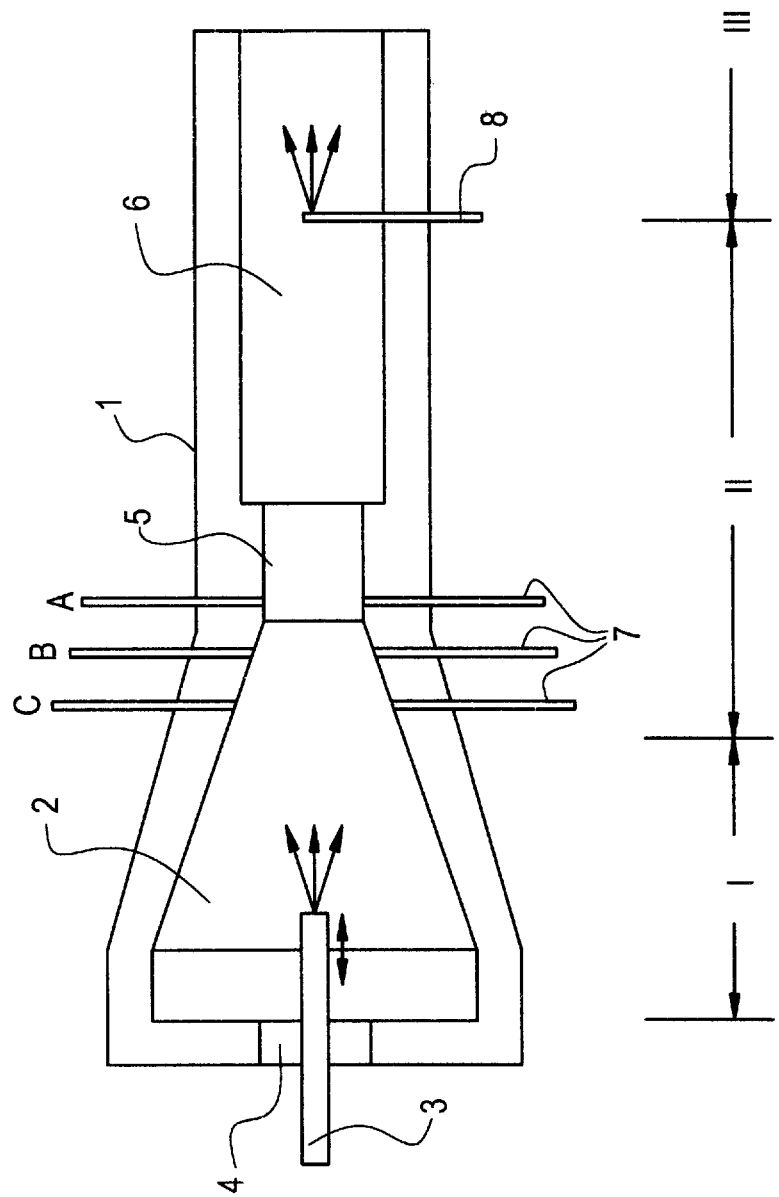

CARBON BLACK AND PROCESSES FOR MANUFACTURING

INTRODUCTION AND BACKGROUND

The present invention relates to new kinds of carbon black that are especially suitable as reinforcing carbon black for the rubber industry and a process for manufacturing these carbon blacks. In a further aspect, the present invention relates to articles of manufacture containing the new types of carbon black.

The most important industrial carbon black manufacturing processes are based on the oxidative pyrolysis of carbon black feedstocks containing carbon. In the known processes the carbon black feedstocks are incompletely burned in the presence of oxygen. This category of carbon black manufacturing processes includes, for example, the furnace black process, the gas carbon black process, and the lamp black process. For the most part polynuclear aromatic carbon black oils are used as the carbon black feedstocks. The product stream in oxidative pyrolysis consists of an off-gas containing hydrogen and carbon monoxide and the dispersed carbon black suspended in it, which is separated from the off-gas in a filter unit. The carbon black that is obtained in this manner is then transformed into small beads or pellets for the most part in a wet or dry pellitizing process to make it easier to handle. The moisture in the carbon black arising from the manufacturing process is reduced through a subsequent drying down to under 1% by weight.

Over 90% of the carbon black that is produced industrially is used as a filler and reinforcer in the manufacture of rubber mixtures for the tire industry. Typical rubber mixtures contain 20 to 70% by weight natural and/or synthetic rubber, 20 to 50% by weight carbon black, mineral oils, and other process materials, as well as sulfur as a vulcanization agent.

The carbon blacks with their specific properties affect the abrasion resistance, the rolling resistance, and the wet traction of the finished tires. For rubber mixtures that are used for tire treads a high abrasion resistance and at the same time the least possible rolling resistance and good wet traction are demanded. Low rolling resistance leads to low fuel consumption for the car.

Rolling resistance and wet traction are affected by the viscoelastic behavior of the tread mixture. When there is periodic deformation, the viscoelastic behavior can be described by the mechanical dissipation factor tan δ and in the event of elongation or compression by the dynamic elasticity modulus |E*|. Both figures are very temperature-dependent. In this connection, the wet traction is usually correlated with the dissipation factor tan $δ_0$ at about 0° C. and the rolling resistance with the dissipation factor tan $δ_{60}$ at about 60° C. The higher the dissipation factor at the low temperature, usually the better is the wet traction of the tire mixture. For reducing rolling resistance, on the other hand, as small as possible a dissipation factor is required at the high temperature.

The abrasion resistance and the viscoelastic characteristics and thus also the dissipation factor of the tread mixtures, are essentially determined by the properties of the reinforcing carbon blacks that are used.

An important determining factor is the specific surface area, in particular the CTAB surface area, which is a measure of the portion of the carbon black surface which is accessible to polymer content. As the CTAB surface increases, the abrasion resistance and tan δ rise.

Further important carbon black parameters are the DBP absorption as a figure measuring the initial structure and the 24M4-DBP absorption as a measure of the remaining structure after strong mechanical compression of the carbon black.

Carbon blacks that have CTAB surface area between 80 and 180 $m^2/g$ and 24M4-DBP absorption values between 80 and 140 ml/100 g are most suitable for tread mixtures.

It has been shown that ordinary carbon blacks cannot influence the temperature dependency of the dissipation factor tan δ sufficiently in such a way that the tread mixture has a low rolling resistance with the same or better wet traction. The desired reduction in rolling resistance is generally linked with a deterioration of the wet traction and tread wear. Carbon blacks that have a low rolling resistance are designated as so-called "low hysteresis" carbon blacks.

In recent years it has been shown that the rolling resistance of tires can be reduced through complete or partial substitution of carbon black by silica (DP 0 447 066 A1). In order to link the silica with the polymer components of the rubber, silane coupling agents are required. Rubber mixtures containing silica have a dissipation factor tan δ that is reduced up to 50%.

An object of the invention is to make available new kinds of carbon black that give rubber mixtures of natural or synthetic rubber or mixtures thereof reduced rolling resistance and at the same time improved wet traction and increased abrasion resistance.

SUMMARY OF THE INVENTION

The above and other objectives of the invention are achieved through a carbon black that has a CTAB surface area between 40 and 180 $m^2/g$, a 24M4-DBP absorption between 80 and 140 ml/100 g, and a specific BET surface area between 40 and 250 $m^2/g$. The carbon black is characterized by the fact that it contains 0.01 to 15% silicon by weight in relation to its total weight.

The silicon is inserted into the carbon black aggregates during the manufacturing process. For this purpose compounds containing silicon can be mixed into the carbon black feed stock, for example. Appropriate compounds containing silicon are organosilicon compounds such as organosilanes, organochlorsilanes, siloxanes, and silazanes. In particular siloxanes, and silazanes are appropriate. Silicon tetrachloride can also be used. The use of trimethoxysilanes or triethoxysilanes and their condensed products are preferred.

BRIEF DESCRIPTION OF DRAWING

The present invention will be further understood with reference to the drawing wherein:

FIG. 1 shows a longitudinal section through the reactor used for manufacturing the carbon blacks in accordance with the invention.

DETAILED DESCRIPTION OF INVENTION

In accordance with a more detailed aspect of the invention the initial compound that is selected has only a small influence on the bonding of the silicon atoms into the carbon black aggregates. Using X-ray electron spectroscopy (XPS) and secondary-ion mass spectroscopy (SIMS) it can be shown that the silicon atoms are oxide bound and homogeneously distributed in the carbon black aggregates. The oxide bond consists for the most part of silicon dioxide. A further portion is made up of silanol groups. While the silanol groups essentially are found on the surface of the carbon black aggregates, the silicon dioxide is distributed over the cross-section of the aggregates. After incorporation in the rubber mixture the groups containing silicon on the surface of the carbon black aggregates influence the interaction of the filler with the polymer rubber components. For covalent bonding of the silanol groups of the carbon black to the mixing polymers, bifunctional silanes such as Si69; namely, bis-(3-triethoxysilylpropyl) tetrasulfides) available from Degussa AG, for example, can be added to the rubber mixtures.

When silicon compounds containing nitrogen, such as the silazanes, for example, are used, nitrogen atoms in the form of aminofunctional groups are found in the carbon black again along with the oxide bound silicon atoms. Such carbon blacks may contain 0.01 to 1% by weight nitrogen, depending on the nitrogen content of the initial compounds and their concentration in the carbon black feedstock.

Even without the addition of a coupling agent, tread mixtures manufactured with the new kinds of carbon black show a higher figure at 0° C. for tan $\delta_0$ and a significantly lower tan $\delta$ at 60° C, than comparable conventional carbon blacks, i. e. carbon blacks that have the same particle size and structure but do not contain silicon. These figures correspond to significantly improved wet traction and at the same time clearly reduced rolling resistance of the tread. Through the addition of bifunctional silanes the parameters of the rubber mixtures can be further improved in a similar fashion as with the silica.

The furnace black process, gas carbon black process, and lamp black process are suitable for the manufacture of carbon blacks. Carbon blacks for the tire industry are manufactured almost exclusively using the furnace carbon black process today. Therefore the manufacture of the carbon blacks in accordance with the invention is explained below using this process.

In the furnace carbon black process the oxidative pyrolysis of the carbon black feedstocks is carried out in a reactor lined with refractory materials. In such a reactor three zones may be distinguished, which are arranged in line, one after the other, along the axis of the reactor and have the reaction media flow through them one after the other.

The first zone, the so-called combustion zone, essentially comprises the combustion chamber of the reactor. Here a hot process gas is produced through the burning of a fuel, as a rule a hydrocarbon, with a surplus of preheated combustion air or other gases containing oxygen. Today natural gas is used for the most part, but liquid hydrocarbons such as light and heavy heating oil can also be used. The combustion of the fuel usually takes place with a surplus of oxygen. The air surplus here promotes the complete conversion of the fuel and serves to control the carbon black quality. The fuel is usually fed into the combustion chamber by means of one or more burner lances.

In the second zone of the carbon black reactor, the so-called reaction zone or pyrolysis zone, carbon black formation takes place. For this purpose the carbon black feedstock, in general a so-called carbon black oil, is injected into the stream of the hot process gas and mixed with it. In relation to the quantity of incompletely converted oxygen in the combustion zone, the quantity of hydrocarbons in the reaction zone is in surplus. Hence the formation of carbon black normally sets in here.

Carbon black oil may be injected into the reactor in various ways. For example, an axial oil injection lance or one or more radial oil lances that are arranged on the circumference of the reactor in a plane perpendicular to the direction of flow are suitable. A reactor may have several planes with radial oil lances along the direction of the flow. At the end of the oil lances there are spray nozzles with which the carbon black oil is mixed into the stream of the process gas.

When carbon black oil and gaseous hydrocarbons, such as methane, for example, are used simultaneously as carbon black feedstock, the gaseous hydrocarbons can be injected into the stream of the hot off-gas separately from the carbon black oil by a special set of gas lances.

In the third zone of the carbon black reactor, the so-called separation zone (quench zone), the formation of carbon black is interrupted through the rapid cooling of the process gas containing carbon black. Through this, unwanted after-reactions are avoided. Such after-reactions lead to porous carbon blacks. The cessation of the reaction is generally achieved through spraying in water by means of appropriate spray nozzles. Generally the carbon black reactor has several places along the reactor for spraying in water or quenching, so that the time that the carbon black stays in the reaction zone may be varied. The residual heat of the process gas is utilized in an attached heat exchanger to preheat the combustion air and the carbon black oil.

The carbon blacks in accordance with the invention can be manufactured through spraying the compounds containing silicon that have been described into the combustion chamber or the pyrolysis zone of the carbon black reactor mixed with the carbon black feedstocks or separately. The mixing of the compounds containing silicon with the carbon black oil can take place in the form of a solution, if the compounds are soluble in the carbon black oil, or in the form of an emulsion. Through these measures a homogeneous integration of the silicon atoms into the primary particles of the carbon black can be achieved. For the separate spraying of the compounds containing silicon into the pyrolysis zone of the carbon black reactor, one or more of the oil lances that are normally used for spraying in the carbon black feedstocks may be used.

The invention is explained in greater detail using a few examples.

EXAMPLES

A number of carbon blacks in accordance with the invention are produced in the carbon black reactor 1, which is portrayed in FIG. 1. The reactor has a combustion chamber 2 in which the hot process gas for the pyrolysis of the carbon black oil is produced through burning oil with a surplus of atmospheric oxygen. The fuel is conveyed into the combustion chamber via the axial burner lance 3.

The combustion air is supplied via the opening 4 in the face wall of the combustion chamber. The combustion chamber tapers conically toward the converging zone. After passing through the converging zone, the reaction gas mixture expands into the reaction chamber 6.

Different positions for the injection of the carbon black oil into the hot process gas by means of the oil lance 7 are designated with A, B, and C. The oil lances have suitable spray nozzles at their ends. At each injection position four injectors are distributed over the circumference of the reactor.

The combustion zone, reaction zone, and quench zone, which are important for the process in accordance with the invention, are designated in FIG. 1 through the Roman numerals I to III. They cannot be sharply separated from one another. Their axial extension depends on the positioning of the burner lances, the oil lances, and the quench water lances 8 in each case.

The dimensions of the reactor used may be seen from the following list:

| | | |
|---|---|---|
| Largest diameter of the combustion chamber: | | 120 mm |
| Length of the combustion chamber up to convergence zone: | | 470 mm |
| Length of the conical part of the combustion chamber: | | 220 mm |
| Diameter of the convergence zone: | | 60 mm |
| Length of the convergence zone: | | 100 mm |
| Diameter of the reaction chamber: | | 200 mm |
| Position of the oil lances[1] | A: | 60 mm |
| | B: | −48 mm |
| | C: | −111 mm |
| Position of the quench water lance(s)[1] | | ≈400–3000 mm |

[1]Measured from the entrance into the convergence zone (+: after entrance, −: before entrance)

All of the carbon blacks produced in the reactor described were pelletized using the usual dry process before characterization and incorporation in the rubber mixtures.

To produce the carbon blacks in accordance with the invention, natural gas as fuel and a carbon black oil with a carbon content of 93.4% by weight and a hydrogen content of 5.9% by weight were used.

The reactor parameters for producing the carbon blacks in accordance with the invention are shown in Table 1. Four different carbon blacks (carbon blacks R1 to R3 and the reference carbon black N234) were produced under reactor parameters that were essentially the same. The production conditions differed only in the quantity of hexamethyldisilazane (HMDS) that was mixed with the carbon black oil as a compound containing silicon.

For the carbon blacks in accordance with the invention the dosing was selected in such a way that the completed carbon blacks contained 1, 2, and 6.5% silicon by weight.

TABLE 1

Reactor parameters for the production of the carbon blacks R1 to R3 in accordance with the invention and the reference carbon black N234

| | | Carbon black | | | |
|---|---|---|---|---|---|
| Reactor parameters | | | | | |
| Parameter | Unit | N234 | R1 | R2 | R3 |
| Combustion air | Nm³/h | 170.6 | 171.5 | 170.4 | 170.3 |
| Temperature of combustion air | °C. | 565 | 550 | 555 | 560 |
| Fuel (natural gas) | Nm³/h | 10.5 | 10.6 | 10.6 | 10.6 |
| Carbon black oil | Kg/h | 33.5 | 33.8 | 32.1 | 30.9 |
| Carbon black oil temperature | °C. | 178 | 178 | 178 | 177 |
| Hexamethyldisilazane | Kg/h | — | 0.16 | 0.27 | 1.22 |
| Position of the carbon black oil injectors | | 4 × A | 4 × A | 4 × A | 4 × A |
| Additive (K₂CO₃ solution) | Kg/h | 4.4 | 4.3 | 4.4 | 4.5 |
| Quench position[1] | mm | 400 | 400 | 400 | 400 |

[1]Measured from the entrance into the convergence zone

The identifying analytical data for the carbon blacks that were produced were determined in accordance with the following standards and are listed in Table 2:

CTAB surface: ASTM D-3765
DBP absorption: ASTM D-2414
24M4-DBP absorption: ASTM D-3493

TABLE 2

Characteristic Analytical Data for Carbon Blacks

| Carbon black | CTAB [m²/g] | DBP [ml/100 g] | 24M4-DBP [ml/100 g] | Si [% by weight] |
|---|---|---|---|---|
| N234 | 122 | 128 | 90 | 0 |
| R1 | 127 | 130 | 92 | 1 |
| R2 | 125 | 132 | 93 | 2 |
| R3 | 124 | 128 | 90 | 6.5 |

Embodiment

The carbon blacks R1 to R3 and the reference carbon black N234 were used to produce rubber mixtures. The viscoelastic properties of the rubber mixtures were determined.

The viscoelastic properties of the rubber mixtures reinforced with these carbon blacks were determined in accordance with DIN 53513. In particular, the dissipation factor tan δ was determined at 0° C. and at 60° C. The test formulation used for the rubber mixtures is listed in Table 3.

TABLE 3

SSBR/BR Test Formulation

| Mixture components | Content [phr] |
|---|---|
| SSBR | 96.0 |
| BR | 30.0 |
| Carbon black | 80.0 |
| ZnO RS | 3.0 |
| Stearic acid | 2.0 |
| Aromatic oil | 10.0 |
| 6 PPD | 1.5 |
| Wax | 1.0 |
| CBS | 1.5 |
| DPG | 2.0 |
| TMTD | 0.2 |
| Sulfur | 1.5 |
| Silane coupling agent Si69 | optional |

The SSBR rubber component is an SBR copolymer polymerized in solution with a styrene content of 25% by weight and a butadiene content of 75% by weight. Of the butadiene 73% by weight is 1,2, 10% by weight is cis 1,4, and 17% by weight is trans 1,4 cross-linked. The copolymer contains 37.5 phr oil and is distributed under the brand name Buna VSL 1955 S 25 by Bayer AG. Its Mooney viscosity (ML 1+4/100° C.) is about 50.

The BR rubber component is a cis 1,4 polybutadiene (titanium type) with a cis 1,4 content of 92% by weight, a trans 1,4 content of 4% by weight, a 1,2 content of 4% by weight, and a Mooney viscosity between 44 and 50. This polymer is distributed under the brand name Buna CB 24 by Bayer AG.

Naftolen ZD from Chemetall was used as an aromatic oil. The PPD portion of the test recipe is Vulkanox 4020, the CBS portion is Vulkacit CZ, the DPG is Vulkacit D, and the TMTD is Vulkacit Thiuram, all from Bayer AG. Protector G35 from the HB-Fuller GmbH was used as the wax.

The carbon black was incorporated into the rubber mixture in three stages as shown in the following tabular chart:

| Settings | |
|---|---|
| Stage 1 | |
| Mixer | Werner & Pfleiderer GK 1.5 N |
| Friction | 1:1.11 |
| Revolutions per minute | 70 min$^{-1}$ |
| Ram pressure | 5.5 bar |
| Empty volume | 1.6 l |
| Filling ratio | 0.7 l |
| Flow temperature | 80° C. |
| Mixing process | |
| 0 to 2 min | Buna VSL 1955 S25 + Buna CB 24 |
| 2 to 4 min | Carbon black + ZnO RS + stearic acid + Naftolen ZD + if appiclable Si69 |
| 4 min. | Vulkanox 4020 + Protector G35 |
| 4 to 8 min | Clean Mix and pour |
| Batch temperature | |
| Storage | 140–150° C. 4 hours at room temperature |
| Stage 2 | |
| Mixer | As in Stage 1 except for |
| Filling ratio | 0.68 |
| Mixing process | |
| 0 to 2 min | Break up the batch from Stage 1 |
| 2 min | Pour |
| Batch temperature | <150° C. |
| Storage | None |
| Stage 3 | |
| Mixer | As in Stage 1 except for |
| Filling ratio | 0.65 |
| Mixing process | |
| 0 to 1.5 min | Batch from Stage 2 + Vulkacit CZ + Vulkacit D and Vulkacit Thiuram + sulfur |
| 1.5 min | Pour and form a sheet on laboratory roller mill (diameter 200 mm, length 450 mm, flow temperature 50° C.) To homogenize then: make incisions 3 X left and 3 X right and fold, then turn 8 X if there is a narrow nip (1 mm) and 3 X if there is a wide nip (3.5 mm) and subsequently pull off sheet. |

The technical properties of the rubber, that is, Shore hardness, tensile stress values M100 and M300, rebound at 0° and 60° C., as well as the dissipation factor tan δ at 0° and 60° C. and the dynamic elastic modulus |E*| at 0° C., are subsequently determined in accordance with the standards listed. The measurement conditions for the viscoelastic properties are compiled in Table 4.

TABLE 4

Determining the Viscoelastic Properties Using DIN 53513

| Vulcanization of the specimens | |
|---|---|
| Vulcanization temperature | 165° C. |
| Duration of vulcanization | $T_{95}$ + 3 min ($T_{95}$:DIN 53529) |
| Specimen shape | |
| Shape | cylindrical |
| Length | 10 mm |
| Diameter | 10 mm |
| Number | 5 |
| Test machine | |
| Type/manufacturer | 830/MTS |
| Kind of load | Elongation |
| Average force amplitude | 50 N |
| Dynamic force amplitude | ±25 N |
| Test frequency | 16 Hz |
| Test procedure | Temper 5 min, then dynamic loading at 16 Hz for 2 min with subsequent measurement |

In each case the median value of the measurements on the five specimens is used.

The results of the technical rubber tests are listed in Table 5. The carbon blacks in accordance with the invention display the typical behavior of so-called inversion carbon blacks. Compared to the reference carbon black they give the rubber mixtures a reduced dissipation factor at 60° C. and a higher dissipation factor at 0° C. For tires manufactured from such rubber mixtures an improved wet traction and at the same time a reduced rolling resistance may be expected.

Further variations and modifications will be apparent to those skilled in the art and are intended to be encompassed by the claims appended hereto.

German priority application 196 13 796.9 is relied on and incorporated herein by reference.

TABLE 5

Results of the Technical Rubber Tests

| Filler | Si69 [phr] | Shore A DIN 53505 | M100 DIN 53504 [MPa] | M300 DIN 53504 [MPa] | Rebound 0° C. ASTM D 5308 [%] | Rebound 60° C. ASTM D 5308 [%] | tanδ DIN 53513 | tanδ$_{60}$ DIN 53513 | E* 0° C. DIN 53513 [MPa] |
|---|---|---|---|---|---|---|---|---|---|
| N234 | 0 | 69 | 2.2 | 10.6 | 13.3 | 34.2 | 0.404 | 0.283 | 66.2 |
| R1 | 0 | 72 | 2.6 | 12.8 | 13.3 | 40.3 | 0.41 | 0.252 | 57.8 |
| R2 | 0 | 70 | 2.4 | 12.0 | 13.2 | 38.7 | 0.415 | 0.27 | 57.1 |
| R3 | 0 | 63 | 1.6 | 7.4 | 12.7 | 38.2 | 0.488 | 0.245 | 41 |
| N234 | 1 | 70 | 2.4 | 11.8 | 13.4 | 36.2 | 0.413 | 0.266 | 61.1 |
| R1 | 1 | 72 | 3.1 | 15.4 | 12.3 | 40.4 | 0.389 | 0.233 | 58.1 |
| N234 | 2 | 70 | 2.6 | 12.9 | 13.2 | 36.9 | 0.384 | 0.264 | 67.4 |
| R2 | 2 | 71 | 3.0 | 15.4 | 12.8 | 42.8 | 0.39 | 0.228 | 56.4 |
| R3 | 2 | 69 | 2.2 | 11.1 | 12.8 | 41.5 | 0.454 | 0.218 | 44.3 |

We claim:

1. A carbon black with a CTAB surface between 40 and 180 $m^2/g$, a 24M4-DBP absorption between 40 and 140 ml/100 g, and a specific BET surface between 80 and 250 $m^2/g$, and comprising 0.01 to 15% chemically incorporated silicon by weight and 0.01 to 1% chemically incorporated by nitrogen by weight in relation to its total weight.

2. The carbon black in accordance with claim 1, which is in the form of aggregates.

3. The carbon black in accordance with claim 2 wherein silicon atoms are oxide bound and homogeneously distributed in said carbon black aggregates.

4. A process for manufacturing a carbon black comprising oxidatively pyrolyzing a carbon black feedstock that contains carbon, wherein said feedstock is mixed with an organic compound containing silicon, and optionally nitrogen, or silicon tetrachloride whereby a carbon black is obtained having a CTAB surface between 40 and 180 $m^2/g$, a 24M4-DBP absorption between 40 and 140 ml/100 g, and a specific BET surface between 80 and 250 $m^2/g$, and comprising 0.01 to 15% silicon by weight in relation to its total weight.

5. The process for manufacturing a carbon black in accordance with claim 4, further comprising spraying said feedstock into a combustion chamber or reaction chamber of a carbon black reactor.

6. The process in accordance with claims 4 wherein the silicon containing compound is a member selected from the group consisting of organosilanes, organochlorsilanes, siloxanes, and silazanes.

7. The process according to claim 4 wherein said silicon compound is soluble in said feedstock.

8. A vulcanizable rubber mixture containing the carbon black according to claim 1.

9. A vulcanized rubber article containing the carbon black according to claim 1.

10. A rubber tire containing the carbon black according to claim 1.

11. A tire made of natural rubber or synthetic rubber, or mixtures thereof containing the carbon black according to claim 1.

12. A process for manufacturing a carbon black comprising oxidatively pyrolyzing a carbon black feedstock that contains carbon, wherein said feedstock is mixed with hexamethyldisilazane whereby a carbon black is obtained having a CTAB surface between 40 and 180 $m^2/g$, a 24 M4-DBP absorption between 40 and 140 ml/100 g, and a specific BET surface between 80 and 250 $m^2/g$, and comprising 0.01 to 15 percent silicon by weight in relation to its total weight.

* * * * *